3,437,575
LIQUID-LIQUID EXTRACTION
Hans-Werner Gross, Buchschlag, Gottfried Schwedler, Frankfurt am Main, and Eckart Muller, Bergen-Enkheim, Germany, assignors to Metallgesellschaft, Aktiengesellschaft, Frankfurt am Main, Germany, a corporation of Germany
Filed Aug. 23, 1966, Ser. No. 574,377
Claims priority, application Germany, Aug. 25, 1965, M 66,437
Int. Cl. B03c 9/00
U.S. Cl. 204—186     10 Claims This invention relates to liquid-liquid extraction processes. It more particularly refers to carrying out liquid-liquid extractions in the presence of an electrical field.

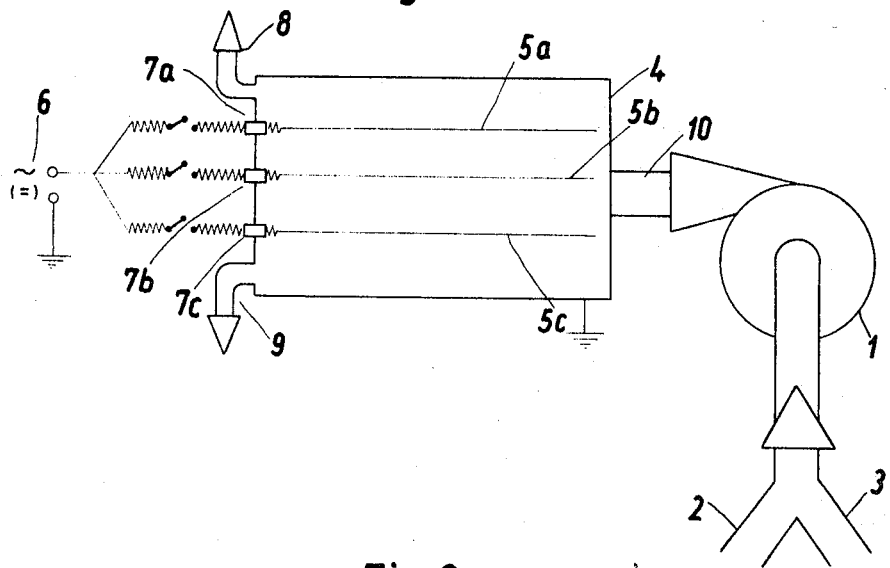
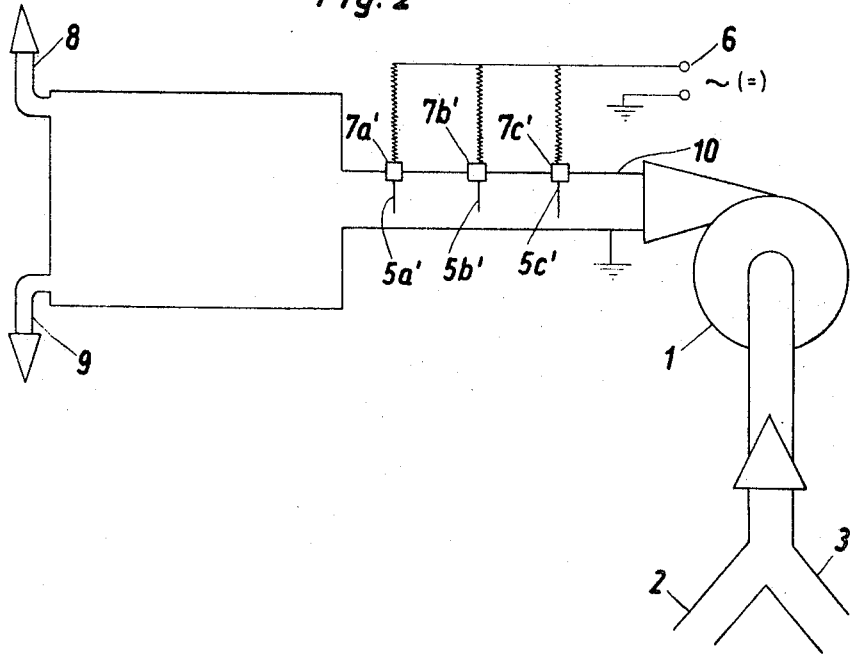

It is known to separate various mixtures of liquids by extraction of one or more components of the mixture with another liquid. This process depends for its utility on preferential solubility of the substance being extracted in the extractant. In some extractions, a polar solvent or extractant has been used, for example, water or aqueous solutions. It has been attempted with some degree of success to use electric fields to aid in the separation of dispersions of two phases.

Illustrative of this type of liquid-liquid extraction are crude oil desalination and refining of oils with acid or alkali. In these cases, water or appropriate aqueous solutions, are intimately admixed with the liquid to be extracted. The intimate mixture must then be phase-separated in order to remove the purified raffinate and the aqueous solution of that which has been extracted. Electric fields have been used for this purpose. It has always been considered necessary in this type of separation to provide the aqueous phase as the dispersed phase and to insure that the aqueous phase does not contain more than about 10 to 15 percent organic, oleaginous material, in order to prevent bridging, and shorting through the bridge, of the aqueous dispersion. Such bridging could cause a current drain increase of up to about 10,000 times the normal current drain, of about 2 to 20m amps per square meter of electrode surface area, and thus cause serious damage to equipment and disruption of operations.

Other processes are known, wherein dispersions of aqueous and non-aqueous materials are separated by means of or with the aid of electric fields. Exemplary of these known processes are: Separation of water in oil emulsions via a three-phase AC field applied with high voltage (see U.S. Patent 2,033,429); crude oil desalination with fresh water added with intense agitation in a high voltage electrical field, reseparation in a second electrical field (see U.S. Patent 2,296,239); dispersion of aqueous saline solutions in oil and re-separation at electrical field strengths of about 1500 to 3000 volts per centimeter and high voltages of about 4000 to 35,000 volts (see French Patent 1,227,935); separation of water in oil emulsions in two (2) electrical fields of about 1600 to 8000 volts per centimeter (see German Patent 1,036,435); and treatment of oils with aqueous acid and alkali solutions with field strengths of about 1600 to 8000 volts per centimeter (see U.S. Patent 2,855,357).

Much prior art has concerned itself with the attempted separation of polar and nonpolar materials with the aid of electric fields. In this regard, polar materials are usually defined as those liquids whose dielectric constant is at least about twice as great as that of the non-polar liquid upon which the extraction process is practiced. The electric field is generally about 100 to 25,000 volts per centimeter, preferably about 6000 to 10,000 volts per centimeter, which field is used to disperse the polar and non-polar organic phases in one another, rather than to separate the two phases. Phase separation is accomplished by means of gravity, such as for example, in a decanter. (See U.S. Patent 2,884,375.) Further, the resolution of a butylamine-kerosene system has been attempted using water as the extractant. This process is reported to be carried out in a multistage extraction column with a plurality of agitators disposed one above the other in each stage respectively. Electrical fields having a voltage of about 310 to 1000 volts and a strength of about 70 to 220 volts per centimeter, are said to be provided between the stages to aid in phase separation. The efficiency for the reported extraction is given at about 51%. (See for example Chem. Ing. Techn. 35 (1963) 12, pp. 851–853.)

It is desirable to provide means for separating substantially non-aqueous liquids from each other, especially non-aqueous liquids having a high organic chemical content. Non-aqueous liquids as used herein, are defined as those having less than about 50 weight percent water, and preferably less than about 20 weight percent water. Such liquids generally have a non-aqueous fraction which consists of at least about 90 weight percent organics. The separation of these types of liquid mixtures is quite important in connection with a number of important industrial processes. For example, lubricating oil is often refined with furfurol, phenol, cresol, nitrobenzene, and/or dichloroethylether (see Erdö und Kohle 18, 2, 80/84 (1965)); petroleum fractions and/or tar gas are deasphalted with propane; aromatics are suitably extracted with a number of solvents (extractants) including ethyleneglycol, N-methyl pyrolidone or sulfolane (see Petroleum, February 1964, pp. 74–75); alcohols are purified with nitro paraffins (see German Patent No. 1,140,-561); and analine or pyridine—as well as their derivatives—are extracted with ethylene carbonate (see U.S. Patent No. 3,072,662).

In the above-referred to extraction processes, it is often the case that the solvent or extractant is the more strongly polar liquid with the higher dielectric constant. In these above-referred to processes, there is usually present up to about 10 to 15 percent water and at least about 20 percent of the more polar extractant. It has therefore been considered extremely difficult, if not impossible, to perform a phase separation by means of an electric field in these processes without in some way altering the relative proportions of the aqueous, polar, and non-polar constituents in order to provide the proper relationship and environment in which the electric field can operate efficiently. It has been proposed to improve such resolution efficiency by increasing the total nonpolar phase and reducing the total polar phase of the system but this procedure will tend to increase the total amount of liquid being processed; up to the point where about 85 percent of the processed liquid would be the non-polar solvent. This is important in order to minimize the potential of the system to short-circuit if significantly less non-polar solvent were present. Further, about 100 to 25,000 volts per centimeter have been thought to be required as the field in order to make the separation. It will be appreciated that such operation, as has been proposed, would involve significantly increased capital equipment and operating costs and would therefore be less economical than is desirable.

It is therefore an object of this invention, to provide a novel process of resolving a mixture of organic liquids.

It is another object of this invention to provide a process of resolving a mixture of organic liquids by means of an electric field.

It is a further object of this invention to provide an economical process for the resolution of a mixture of organic liquids.

Other and additionals objects of this invention will become apparent from a consideration of this entire specification including the claims and drawing appended hereto.

In accord with and fulfilling these objects, this invention includes, in one of its aspects, the resolution of organic compound mixtures by means of a low voltage and of a low field. This invention is particularly useful in processes where mixtures of organic compounds are extracted with an organic liquid extractant and where the more polar liquid is dispersed in the non-polar or less polar liquid.

Understanding of this invention will be facilitated by reference to the accompanying drawing in which:

FIG. 1 is a front elevation schematic view of a process according to this invention; and FIG. 2 is a front elevation schematic view of a modified process according to this invention.

Referring now to this drawing, it is seen that this process is illustrated by the use of a multiplicity of electrodes (three being shown in the drawing for simplicity sake). Referring particularly to FIG. 1 a mixing pump 1 is fed from two lines 2 and 3 with the extractant and the liquid to be extracted. The mixed liquid leaves the mix-pump 1 through a line 10 and is fed for a separation vessel 4, which may suitably be a decanter as shown. There are disposed in the separator 4 three electrodes 5a, 5b and 5c, which are disposed at spaced intervals through out the height of the separator 4. Each of the electrodes is fed electrical power from a source 6, which may be A.C. or D.C., through insulators 7a, 7b and 7c disposed in the wall of the separator. Provision is made for recovery of the resolved phases 8 and 9 from the separator.

Referring now to FIG. 2, it will be seen that the process described with reference to FIG. 1, is substantially followed in the modification shown in FIG. 2, except that the electrodes 5a', 5b' and 5c' are introduced to the system through insulators 7a', 7b' and 7c', respectively which are disposed in the wall of the conduit 10 between the mixing pump 1 and the separator 4.

In accord with this invention, the field strengths of the electrodes used, are about 1 to 60 volts per centimeter, preferably about 10 to 30 volts per centimeter. Suitably, the electrodes operate off normal line voltage, that is about 110 to 220 volts. It is within the scope of this invention, to impress about 10 to 500 volts upon the electrodes. When operating within these parameters, which are quite mild by comparison with that suggested by the prior art, it has been found that the polar phase may represent, under some circumstances, up to about 60 to 70 percent of the liquid mixture being resolved and under substantially any circumstances up to about 50 percent of the liquid mixture being resolved.

In accord with another aspect of this invention, it has been found that the proper positioning of the electrode can substantially increase the resolution and phase separation efficiency of this system. In phase separations of this type, it is known that the phases separate by gravity into an upper, lighter phase and a lower, heavier phase with a layer or band of mixed phases in between the two distinct phases. For this reason, it is common for a decanter to operate with its feed into the mixed phase zone and its takeoffs at points far removed from the mixed phase zone. It has been found that, in a single stage phase separation according to this invention, the electrode should be placed optimally at the upper edge of the mixed phase zone.

Where a single stage separation is practical and where the dynamic equilibrium of the system is sufficiently stable, so as to enable this electrode to be fixedly positioned at the top of the mixed phase, it may be sufficient to provide a single electrode in the system. It often happens, however, that the phase separation system is not sufficiently stable to produce a relatively fixed positioning of the upper edge of the mixed phase zone. Under these circumstances, it may be expedient to provide a movable electrode which can be adjusted in position to correspond to this mixed phase upper edge. Alternatively, it may be more practical to provide a series of electrodes which can be operated alternatively depending upon the relative position of the top of the mixed phase. Thus, it is not uncommon to employ up to about 10 to 30 or more extraction stages in the resolution of organic liquid mixtures. Where the extraction is acomplished, for example, in a column, the extraction stages are not necessarily stable with respect to their position relative to each other and/or relative to the extraction column itself. It is believed that this instability is due principally to the variations in density of the phases as they separate.

In this type of a system, it has been found to be particularly advantageous to use a multiplicity of electrodes suitably spaced apart and suitably positioned along the length of the column. In this manner, it has been found to be practical to have an appropriately positioned electrode available, regardless of where the mixed phase—lighter phase boundary or boundaries—are.

It has been discovered that an electrode, immersed in the polar phase, draws about 10 to 100 times the amount of current that the same electrode draws when it is positioned at the mixed phase-light interface. Thus, it has been found that it is quite possible to accurately control the designation of which electrodes are drawing current and in operative relationship at any given time so as to provide each mixed phase-lighter phase interface with its most proximate electrode. Relays can suitably be provided by known electronic switching means to automatically turn the power on or off to any given electrode depending upon its current draw.

A still further aspect of this invention resides in the discovery that improved separation can be accomplished, within the operating parameters defined above, if the electric power is fed to the electrode or electrodes intermittently. Thus, it has been found that short impulses of power, fed to the appropriate electrode or electrodes in a multiple stage separation, as discussed above, are the most desirable means of achieving maximum separation efficiency.

It will be appreciated that the duration of the electrical power impulse to any given electrode will, to a great extent, be determined or at least influenced by the loading on the separator and on the residence time of the liquids being resolved. Where the separator loading is high, it has been found to be more desirable to provide for relatively short duration impulses. Conversely, where the separator loading is low, longer impulses should be used. A range of impulse durations of about 0.1 to 1 second has been found to be a good range in which to operate. It is preferred that the impulse duration be about 0.2 to 0.5 second for best operation. The interval between impulses should suitably be about 0.1 to 2.0 seconds, preferably 0.3 to 0.5 second, during which interval no current is fed to the electrode in question. For optimum operation, the outlet products for each stage should be monitored to determine the resolution efficiency of each stage. The time of impulse duration and the interval between impulses can then suitably be adjusted to conform to the conditions found and thereby increase the efficiency of separation by varying the parameters within the prescribed limits. In monitoring the separation stage products, analysis should be conducted to determine the proportion of foreign substance in the "pure" phase being analyzed. The operating parameters should be adjusted to provide less than about 5 percent foreign substance in the pure phase. Of course, the most desirable circumstance is to have zero foreign matter in the pure phase. Thus, the foreign matter content should be maintained between 0 and about 5 percent in the pure phase separation stage product.

The electrodes can be made of perforated or slotted plates, woven wire or rods and tubes, and they may be constructed, if desired, as baffles. It is best to make them in such a manner that they have no sharp edges or corners. The electrodes extend expediently over the entire area of the separator, and are disposed one over the other at equal or unequal intervals. They can be connected parallelly to the electric current, or they can be alternately energized and grounded, so that a plurality of electric fields one above the other are the result. In many cases, the electrodes can also be installed in the conduit from the mixer to the separator, and a combination of electrodes in the conduit and electrodes in the separator has proven valuable.

Another important feature of the process of the invention consists in the fact that, in contrast to the prior-art methods of separation with the aid of natural and artificial gravity fields, the more intimately the two phases are mixed in the dispersion to be separated, the greater the separating efficiency will be.

Whereas in the prior art multiple-stage extraction processes, designers have striven to plan the pumps between the individual stages in such a manner that they mix only as much as is necessary for the adjustment of the equilibrium of the phases, it is advantageous in the process of the invention to plan the pumps for the highest possible mixing effect, thereby simultaneously inducing the condition that is necessary according to the invention, of having the polar phase dispersed in the non-polar phase.

To illustrate the invention we shall consider by way of example the improvement of separating speed in the extraction of aromatics from their mixtures with other hydrocarbons by means of hydrous N-methylpyrrolidone (NMP).

The experiments were performed in the apparatus represented in FIG. 1.

The following example is given by way of illustration of this invention without being limiting thereon.

Example

N-methylpyrrolidone with a water content of 12% serves as the extractant (polar phase). The non-polar phase was a mixture of pentane and toluene in a ratio that was adjusted so as to produce a specific gravity difference of 0.2 between the two phases. The two phases had the following composition in percentage by weight:

|  | Heavy phase | Light phase |
| --- | --- | --- |
| NMP | 75 | 15 |
| Water | 10 | 0 |
| Toluene | 13 | 43 |
| Pentane | 2 | 42 |
| Total | 100 | 100 |

The two phases were used in a volume ratio of 1:1, intimately mixed in a pump, and fed to the separator. Between the grounded walls of the separator and the electrodes there was a space of 10 cm., and the electrodes themselves were 10 cm. apart. The power source was the public utility line voltage of 220 volts AC, which could be reduced to 10 volts or increased to 500 volts by a transformer. In this manner, any desired field strength could be set up.

The maximum achievable hourly throughput of the polar phase (N-methylpyrrolidone), which was the heavier phase in the present case, per square meter of separator area, was taken as the separator loading. The following values were found:

| Field strength, volts/cm. | Separator loading, $m.^3/m.^2/h.$ | Separator output improvement factor |
| --- | --- | --- |
| None | 5 | 1 |
| 5 | 11 | 2.2 |
| 10 | 22 | 4.4 |
| 20 | 30 | 6 |

The separator loading could not be further increased by further increasing the field strength. At 60 volts/cm. foreign phases occurred in the extractor outputs, increasing in quantity with the field strength.

By switching the voltage on and off for short periods, namely 0.25 second on and 0.5 second off, it was possible to increase the extractor output by another 20%, particularly at higher field strengths of 40 to 60 volts/cm.

At a field strength of 40 volts/cm., an on-period of 0.25 sec. and an off-period of 0.5 sec. in steady alternation, the separator output in the above case was 36 $m.^3/m.^2/h.$, corresponding to an improvement of factor of 7.2 over field strength zero, i.e., phase separation without the action of an electrical field.

What is claimed is:

1. In the process of separating liquid mixtures of substantially non-aqueous components, wherein the more polar of said components constitutes about 20 to 75 percent of said mixture, by the application of an electric field; the improvement which comprises operating said electric field at about 1 to 60 volts per centimeter at a voltage of about 10 to 500 volts.

2. The improved process claimed in claim 1, wherein said field is about 10 to 30 volts per centimeter, said voltage is 110 to 220 volts and said more polar phase constitutes about 40 to 70 percent of said mixture.

3. The improved process claimed in claim 1, wherein a plurality of electrodes are employed in said process.

4. The improved process claimed in claim 3, wherein only said electric field is impressed only on electrodes not immersed in the more polar phase.

5. The improved process claimed in claim 3, wherein said electrodes have substantially rounded edges.

6. The improved process claimed in claim 1, wherein said electric field is applied intermittently.

7. The improved process claimed in claim 6, wherein said field is impressed for about 0.1 to 1 second at intervals of about 0.2 to 2 seconds.

8. The improved process claimed in claim 6, wherein said field is impressed for about 0.2 to 0.5 second at intervals of about 0.3 to 0.5 second.

9. The improved process claimed in claim 1, wherein said electrode is positioned substantially at the interface of the mixture and the lighter separated phase.

10. The improved process claimed in claim 1, including the further process step of intimately mixing the components of said mixture, whereby the more polar phase is disbursed in the less polar phase, prior to said separation.

References Cited

UNITED STATES PATENTS

| 2,884,375 | 4/1959 | Seelig et al. | 204—188 |
| 2,960,454 | 11/1960 | Warner et al. | 204—186 |
| 2,995,503 | 8/1961 | Warner et al. | 204—186 |
| 3,200,059 | 8/1965 | Mills | 204—186 |

HOWARD S. WILLIAMS, *Primary Examiner.*

T. TUFARIELLO, *Assistant Examiner.*

U.S. Cl. X.R.

204—305

U.S. DEPARTMENT OF COMMERCE
PATENT OFFICE
Washington, D.C. 20231

UNITED STATES PATENT OFFICE
CERTIFICATE OF CORRECTION

Patent No. 3,437,575                                            April 8, 1969

Hans-Werner Gross et al.

It is certified that error appears in the above identified patent and that said Letters Patent are hereby corrected as shown below:

Column 2, line 29, "Erdö" should read -- Erdöl --; line 33, "pyrolidon should read -- pyrrolidone --. Column 3, line 34, "through out" should rea -- throughout --. Column 4, line 31, after "light" insert -- phase --. Column 6, line 56, "disbursed" should read -- dispersed --.

Signed and sealed this 7th day of April 1970.

(SEAL)
Attest:

Edward M. Fletcher, Jr.                          WILLIAM E. SCHUYLER, JR
Attesting Officer                                       Commissioner of Patents